May 19, 1931.  W. GIGER  1,806,158
CLUTCH OPERATING MECHANISM
Filed April 1, 1929
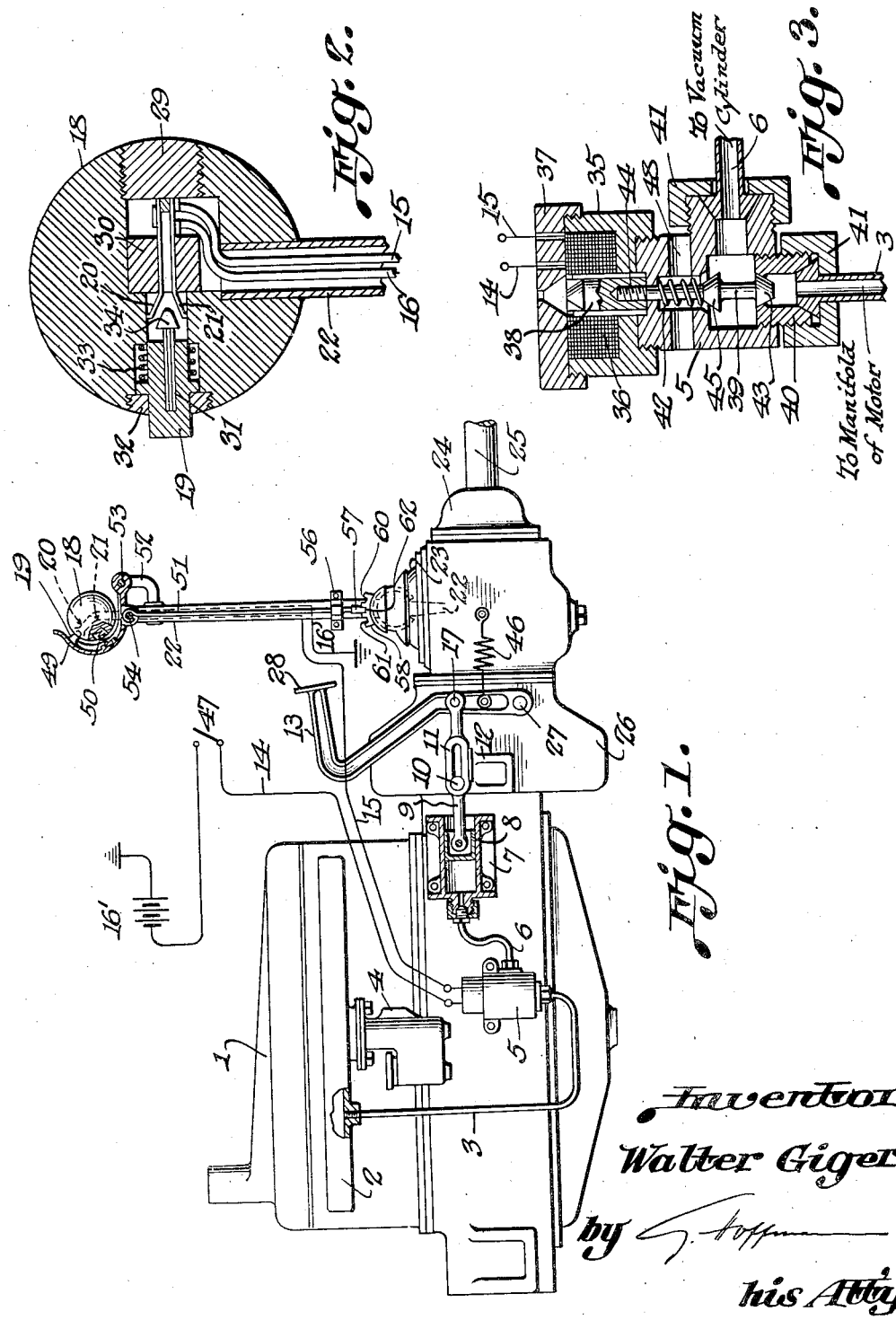
Inventor:
Walter Giger;
by [signature]
his Atty.

Patented May 19, 1931

1,806,158

UNITED STATES PATENT OFFICE

WALTER GIGER, OF CAMDEN, NEW JERSEY

CLUTCH OPERATING MECHANISM

Application filed April 1, 1929. Serial No. 351,531.

This invention relates to clutch operating mechanism especially for use in connection with motor driven vehicles.

The object of the invention is to provide means for operating the clutch automatically thus facilitating the gear shifting.

In one practical embodiment of the invention I propose to equip the gear shifting lever with an electric switch for controlling an electromagnetic valve which in turn controls a vacuum device adapted to operate the clutch.

With the above and other objects in view, the invention consists in the clutch operating mechanism and in the form, construction and relative arrangement of its several parts as will be hereinafter more fully described, illustrated in the accompanying drawings, and subsequently incorporated in the subjoined claims.

In the drawings wherein I have illustrated one embodiment of the invention, and in which similar reference characters designate corresponding parts throughout the several views:

Fig. 1 is a side elevation of a part of a motor driven vehicle showing the engine and other adjacent parts embodying my invention, Fig. 2 is an enlarged detail view in section showing the head of the gear shift lever, Fig. 3 is a detail view showing the electromagnetic control valve in section.

Referring to the drawings and more particularly to Fig. 1 thereof, 1 indicates an internal combustion engine of a self propelled vehicle. The manifold 2 of this engine to which carburetor 4 is attached is directly connected with an electromagnetic valve 5 by means of a pipe 3. This valve 5 in turn is in connection with the head end of a vacuum-cylinder 7 by means of a pipe line 6. A piston 8 operating in the cylinder 7 is equipped with a rod 9 the free end of which slides in a loop 10 formed by another rod 11 which by means of a pin 17 is connected to the clutch operating lever 13. The clutch is contained in housing 26 and connects in usual manner the engine 1 with the gearing in housing 23. A nose 12 secured to the clutch housing 26 supports the loop 10 of rod 11. Lever 13 is pivotally mounted at the shaft 27 which extends into the housing 26 where it is connected to the clutch. A spring 46 holds the clutch operating lever 13 in its normal position. The gearing in housing 23 is connected to the driving axle of the vehicle by means of an universal joint located within the housing 24 and to the transmission shaft 25. The driving axle forming no part of the invention is not illustrated in the drawings. A gear shift lever 22 is equipped with a current control knob as at 18. An electric circuit starting at the storage battery 16' which is grounded with one pole and connected by wire 14 with the other pole over switch 47 which may be arranged on the dashboard of the vehicle or on the steering wheel to the electromagnetic valve 5 and from here over wires 15 and 16 to the ground thus completing the circuit. This circuit can be opened and closed by means of push button 19 at the knob 18 provided switch 47 is closed.

The switch contained in the gear shift lever knob 18 is only diagrammatically indicated in Fig. 1; a more detailed illustration is given in Fig. 2. Here the current wires 15 and 16 contained in the hollow shaft of the gearshift lever 22 are suitably fastened with their ends to the control blades 20 and 21 respectively within the knob 18. These blades are held in spaced relation to each other by a block 30 consisting of insulating material. A push button 19 normally held in open position by a spring 33 and retained in the knob 18 by a threaded ring 32 is fitted with an electric contact point 34 carried by means of a stem 31. A removable plug 29 allows easy access to the wire connections within the knob 18. With the exception of the electric contact blades 20 and 21 and the contact point 34 the single parts of the knob 18 as well as the knob itself may be made of electric insulating material.

The electromagnetic valve 5 controlled by the switch contained in knob 18 is shown in detail in Fig. 3. The valve stem 39 carries the valves 43 and 45 and is held by a spring 42 in such a manner that valve 43 normally rests on its seat 40 while valve 45 is kept in an open position thus connecting pipe 6 of the vacuum cylinder 7 over passage 48 with the atmosphere. The valve stem 39 possesses an extension 44 by means of which the stem is secured to the magnet armature 38. As long as coil 36 is not energized the armature 38 assumes the position shown in Fig. 3 thus leaving an air gap between the not engaged end of the armature 38 and the cover 37 of the magnet housing 35. As soon as the coil 36 is energized the armature 38 and thereby stem 39 will be pulled towards the housing cover 37 until valve 45 is tight on its seat. Valve 43 opens and establishes direct connection between manifold 2 and the vacuum cylinder 7.

From the above description the operation of the mechanism will be readily understood. Thus, the clutch in housing 26 can be disengaged by pressing down lever 13 which as shown may be provided with a foot plate 28. The gear can now be shifted by means of lever 22 and as soon as lever 13 is released spring 46 brings the same back to its normal position in which the clutch is closed thus power can be transmitted from the engine to the parts to be driven. According to the invention the gear shifting is much simpler when the engine is running. It is merely necessary that switch 47 is closed and the gear shifting can be carried out by one hand of the operator only namely, the hand of the operator grasps button 18 of the gear shift lever 22, presses push button 19 whereby the electric circuit will be closed and coil 36 of the magnet electric valve 5 energized. This causes as described the closure of valve 45, and valve 43 makes at the same time connection between engine manifold 2 and the vacuum cylinder 7. The atmospheric pressure pushes piston 8 into cylinder 7. Thereby piston 8 pulls the clutch lever 13 to which it is connected over the parts 9 and 11 against the action of the spring 46 and releases the clutch. As this operation takes place instantaneously by closing the electric control circuit the operator can shift the gears practically simultaneously with the pressing of button 19 or at least an instant later. The release of button 19 opens the electric circuit deenergizes the coil 36 in valve 5 and under the action of spring 42 valve 45 opens and valve 43 closes and the interior of the vacuum cylinder 7 will be again under atmospheric pressure thus equalizing the forces produced before on the outside of piston 8. The spring 46 will now immediately bring lever 13 in its normal position whereby the clutch will be closed again.

In order to prevent any operation of the gear shift lever while the electric circuit is still open 30 arrangements may be made to connect button 19 with suitable means for locking the shift lever. In Fig. 1 I have further illustrated how the push button may be operated. As shown a handle 49 partly embracing the knob 18 and pivotally connected to an arm 52 as at 53 extends over push button 19 and rests on it. A spring 50 connecting the handle 49 with the knob 18 holds the handle in its normal position. The arm 52 is rigidly fixed to the lever 22. A rod 51 is fastened to the handle 49 as at 54 and extends downwardly alongside the shift lever 22 where it is held in proper position by a bearing bracket 56. The free end 57 of the rod 51 is somewhat enlarged and fits in any of the notches 60, 61 and 62 of a segment 58. This segment is secured to the socket 59 of the lever ball on top of the gear housing 23. The rod 51 prevents, therefore, the moving of the shift lever as long as part 57 engages one of the notches in the segment 58. In as much as the handle 49 connects positively push button 19 with the locking rod 51 both these parts can not be operated separately. As soon as handle 49 is pressed towards knob 18 against the action of the spring 50 the button 19 will also be pressed and closes the electric control circuit. At the same time handle 49 pulls rod 51 upwardly and its lower end 57 disengages the segment 58. The gears can now be shifted. After the shifting is completed and the handle 49 released push button 19 returns to its normal open position and part 57 of the rod 51 engages again one of the notches 60, 61 or 62 according to the position of the lever thus locking the shift lever.

While I have herein referred to one possible embodiment of the essential features of my invention, the same might also be incorporated in various other alternative structures, and I therefore reserve the privilege of resorting to all such legitimate changes in the form, construction and relative arrangement of the several parts as may be fairly incorporated within the spirit and scope of the invention as claimed.

I claim:

1. In a motor vehicle having a manifold and a transmission mechanism, a gear shift lever having a knob thereon, a clutch, a vacuum device connected to said clutch, an electric circuit including an electromagnetic valve positioned between the manifold and the vacuum device and adapted to place the vacuum device in communication with the manifold in one position of the valve and in communication with the atmosphere in another position of the valve, switch means on said knob for closing and opening said circuit independent of the speed of the engine, means for locking the gear shift lever in position, and means connecting the switch means with said locking means for simultaneously operating said switch means and said locking means.

2. In a motor vehicle, the combination of an engine, having a manifold, a transmission mechanism, a gear shift lever with a knob thereon, a clutch, a vacuum device operatively connected with said manifold, an electric circuit including means for controlling the vacuum device, a switch on the said knob for opening and closing the said electric circuit, means for locking the gear shift lever in position, and means connecting said switch and said locking means for simultaneously operating said switch and to disengage said locking means.

3. In a motor vehicle having a gear housing, a gear shift lever having a knob thereon, an arm rigidly carried by said lever, a switch handle pivoted to said arm and embracing said knob, a rod having one end fastened to said handle and its other end being enlarged, a bearing bracket for holding said rod alongside of said lever, a segment secured to said gear housing and having notches therein for selectively receiving the enlarged end of said rod when the switch handle is in its open position whereby the gear shift lever is locked against movement.

In testimony that I claim the foregoing as my invention, I have signed my name hereto.

WALTER GIGER.